United States Patent
Berthomieu et al.

(10) Patent No.: US 7,765,913 B2
(45) Date of Patent: Aug. 3, 2010

(54) PNEUMATIC BRAKE BOOSTER COMPRISING A NONRETURN VALVE FOR DISCHARGING AN INTERNAL OVERPRESSURE

(75) Inventors: Bruno Berthomieu, Barcelone (ES); Juan Simon Bacardit, Barcelone (ES)

(73) Assignee: Robert Bosch GmbH, Stuttgart (DE)

( * ) Notice: Subject to any disclaimer, the term of this patent is extended or adjusted under 35 U.S.C. 154(b) by 385 days.

(21) Appl. No.: 12/043,984

(22) Filed: Mar. 7, 2008

(65) Prior Publication Data
US 2008/0216642 A1 Sep. 11, 2008

(30) Foreign Application Priority Data
Mar. 8, 2007 (FR) .................................. 07 01767

(51) Int. Cl.
*F15B 9/10* (2006.01)
(52) U.S. Cl. .................................................. 91/376 R
(58) Field of Classification Search ................ 91/376 R
See application file for complete search history.

(56) References Cited

U.S. PATENT DOCUMENTS 4,195,661 A   4/1980   Takeuchi
5,802,852 A * 9/1998   Harbaugh ................. 91/376 R
5,890,775 A * 4/1999   Tsubouchi et al. ........ 91/376 R
6,829,976 B2 * 12/2004 Wake ........................ 91/376 R

FOREIGN PATENT DOCUMENTS

DE   2639921 A1   3/1978
FR   2864501 A1   7/2005

OTHER PUBLICATIONS

FR07 01767 Search Report.

* cited by examiner

*Primary Examiner*—Michael Leslie
(74) *Attorney, Agent, or Firm*—Michael Best & Friedrich LLP

(57) ABSTRACT

This invention relates to a brake booster (201) having an axis (X), comprising an enclosure divided into a front chamber (210) and a rear chamber (208) by a skirt (209) fastened to a piston (205) mounted so that it can slide in the axial direction (X), the booster comprising a nonreturn valve (225) to evacuate air from the front chamber when the pressure prevailing exceeds a certain reference value.

According to this invention, this booster is characterized in that this nonreturn valve (225) is internal to the booster (201).

6 Claims, 3 Drawing Sheets

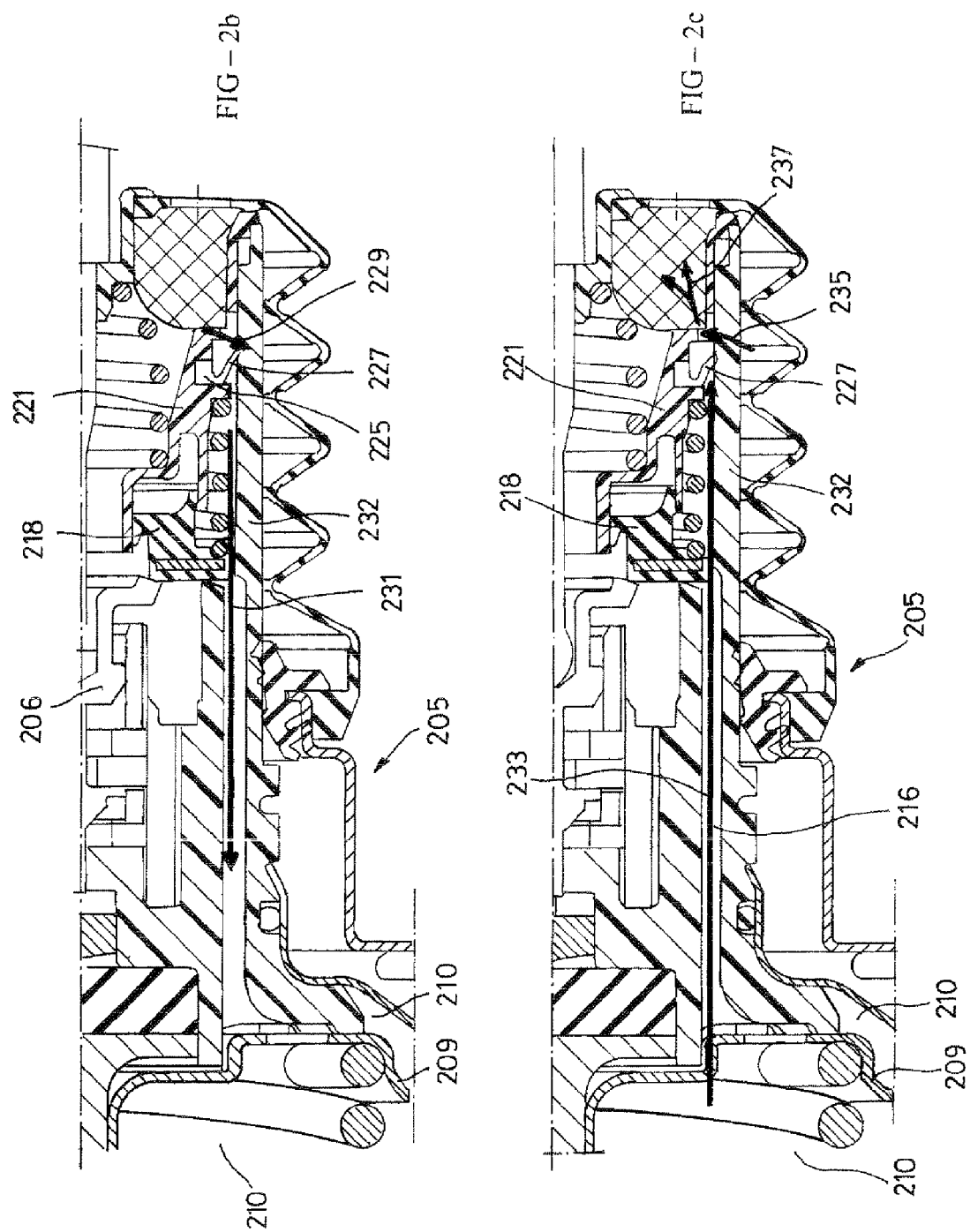

PNEUMATIC BRAKE BOOSTER COMPRISING A NONRETURN VALVE FOR DISCHARGING AN INTERNAL OVERPRESSURE

BACKGROUND OF THE INVENTION

The present invention relates primarily to a pneumatic brake booster of a motor vehicle, this booster comprising a nonreturn valve for discharging an internal overpressure.

A braking system for an automobile generally comprises a pneumatic brake booster which assists the driver during a braking operation.

For that purpose, one type of booster known in the prior art, such as the booster 1 represented in FIG. 1a, comprises an enclosure 2 divided into a front chamber 2A and a rear chamber 2B by a skirt 3 fastened to a piston 21 mounted so that it can slide in an axial direction X. The front chamber 2A can be connected to a vacuum source. The rear chamber 2B can either be connected to the front chamber 2A or be connected to a high-pressure source (for example atmospheric pressure).

When the driver of the automobile activates braking by pressing on the brake pedal, he opens a channel which connects the rear chamber 2B with the atmospheric pressure source and closes a channel which connects the rear chamber 2B with the front chamber 2A. Then the pressure differential between the rear chamber 2B (atmospheric pressure) and the front chamber (at vacuum pressure) exerts a force on the skirt 3, this force being the power assistance which assists the driver when he is braking.

The current standards pertaining to automobile braking systems require that these systems proportion a defined level of deceleration to the vehicles incorporating them in the event of power assistance failure and, in particular, in the event of a lack of vacuum pressure in the front chamber 2A. Now, if the air is not emptied from the front chamber 2A, and if the driver brakes, the air present in this front chamber 2A is compressed progressively as the skirt 3 advances and hence exerts a force on the skirt in the opposite direction to the braking force, thereby reducing braking efficiency.

The patent application with the publication number FR 2 864 501 proposes, in order to empty the air in the event of vacuum circuit failure, a booster 1 of the aforementioned type which additionally comprises shut-off means 8 (see FIGS. 1a and 1b) for placing the front chamber 2A in communication with the free air, these means comprising a non-return valve which is urged into the closed position by the action of atmospheric pressure.

In the event of a fault in the vacuum circuit, the air contained in the front chamber 2A does not remain confined within this chamber when the driver actuates the brake pedal. The movement of the skirt 3 compresses the air contained in the front chamber 2A until it causes the nonreturn valve 8 to open. The air is then expelled from the front chamber 2A by flowing through passage orifices in the nonreturn valve.

However, the latter solution presents a problem concerning the position of this nonreturn valve. The fact is that the nonreturn valve 8 is exposed to the dust which may be present in the engine. As a result of this dust, which may accumulate particularly in the space 20 so as to prevent the closure of the valve 8, this valve 8 may hence remain open and hence cause a permanent leak of the vacuum pressure in the front chamber, reducing the power assistance provided by the booster.

SUMMARY OF THE INVENTION

It is therefore an object of the present invention to provide a booster comprising a nonreturn valve to allow the air which is contained in the front chamber to escape, particularly in the event of vacuum circuit failure, while at the same time maintaining the leaktightness of this front chamber during the normal operation of the booster and preventing the dust which may be present in the engine compartment from influencing its operation.

The main subject of the present invention is a pneumatic brake booster having an axis, comprising an enclosure divided into a front chamber and a rear chamber by a skirt fastened to a piston mounted so that it can slide in an axial direction, the booster comprising a nonreturn valve to evacuate air from the front chamber when the pressure prevailing exceeds a certain reference value, characterized in that this nonreturn valve is internal to the booster.

The reference value can be the atmospheric pressure.

Since the front chamber can generally be connected to a vacuum source, if this source no longer performs its function correctly, with the pressure in the front chamber increasing and the driver having to brake without power assistance, the air contained in this front chamber can escape through the nonreturn valve. According to this invention, this nonreturn valve is internal, that is to say that it is able to be in contact only with air which is inside the enclosure or the booster piston. This protects the nonreturn valve from the dust prevailing in the engine compartment.

By virtue of this invention, the dust prevailing in the engine compartment cannot impede the normal operation of the nonreturn valve by compromising its leaktightness when this leaktightness is required.

According to the prior art disclosed in FR 2 864 501, in order to allow the air which is contained in the front chamber to escape in the event of vacuum circuit failure while at the same time maintaining the leaktightness of this front chamber during the normal operation of the booster, shut-off means comprising a nonreturn valve are proposed whose function is to place the front chamber in communication with the free air: the prior art valve is outside the booster, that is to say outside the enclosure and/or the piston. Consequently, as far as a person skilled in the art is concerned, the fact that the valve is introduced inside a booster does not follow in an obvious manner from this prior art since, given that a booster is a mass-produced device which is constantly being improved so as to reduce its cost, its mass and its size, it still remains very difficult to make any modification to its interior while maintaining the strict requirements in terms of cost, mass and size that apply to any device inside automobiles.

In one embodiment, with the rear chamber being designed to be connected either to the front chamber via a channel passing through the piston or to an internal part of the piston having the reference value as pressure, the nonreturn valve is mounted in the piston such that the moving part of the nonreturn valve is between air coming from this channel and air coming from the internal part of the piston having the reference value as pressure.

Indeed, by definition a valve has a moving part. Since, normally, the air coming from the channel has a low pressure due to the operation of a vacuum source which depressurizes the front chamber, this moving part is subjected, during the normal operation, to a pressure force which is applied to its part which is in contact with air coming from the internal part of the piston having the reference value as pressure. If the pressure of the front chamber exceeds the reference value particularly owing to the failure of the vacuum source, the moving part of the valve is then subjected to a force which is applied on the opposite side, that is to say on the side which is in contact with air coming from this channel, and hence from the front chamber.

According to one embodiment of the invention, the piston comprises at least one filter for filtering the air which enters the internal part of the piston having the reference value as pressure.

By virtue of this embodiment, the air which comes into contact with the nonreturn valve is filtered, and hence the nonreturn valve is even more protected from the polluted ambient air present in the engine compartment.

In one embodiment, the nonreturn valve comprises a directional cup comprising a lip which extends radially toward the outside of the cup, the lip being designed to: block the passage of the air from the internal part of the piston having the reference value as pressure to the channel connecting the rear chamber and the front chamber, when the pressure in this channel is below the reference value, allow the air from the channel connecting the rear chamber and the front chamber to pass toward the internal part of the piston having the reference value as pressure, when the pressure in this channel is above the reference value.

This lip may be annular or partially annular.

According to one embodiment, the cup is mounted in a radial groove of a cage bearing a three-way valve shutter which is able to open and to close the channel connecting the rear chamber and the front chamber and to connect the rear chamber with a source of pressure at the reference value, this cage being adapted by means of at least one aperture to allow the air present in the internal part of the piston having the reference value as pressure to pass as far as the lip of the cup.

By virtue of this embodiment, the cup can replace a static O-ring seal which is generally present in the prior art boosters to isolate the valve assembly, since the cup can also perform this function.

BRIEF DESCRIPTION OF THE DRAWINGS

The present invention will be better understood from the description which follows and from the appended figures, in which the front and rear correspond to the left and right of the drawings, respectively, and wherein.

DETAILED DESCRIPTION

The same references will be used to describe those elements having the same functions in the various figures relating to the invention.

Figure 1A:
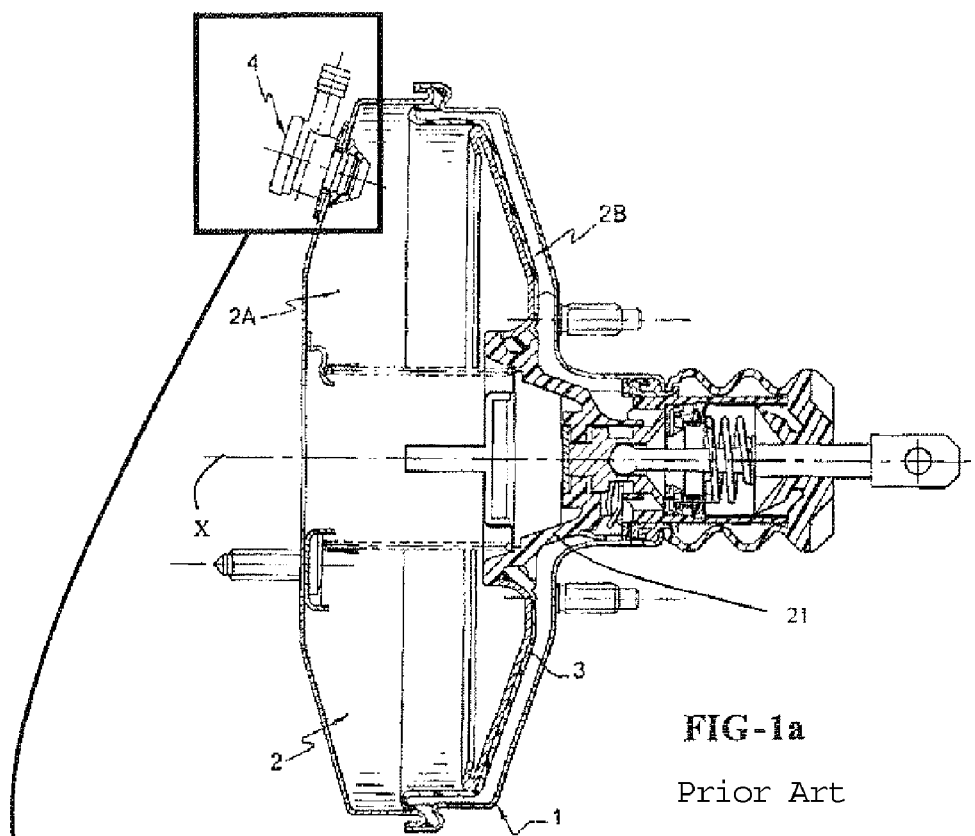
FIG. 1a is a view in axial section of a prior art booster.
Figure 1B:
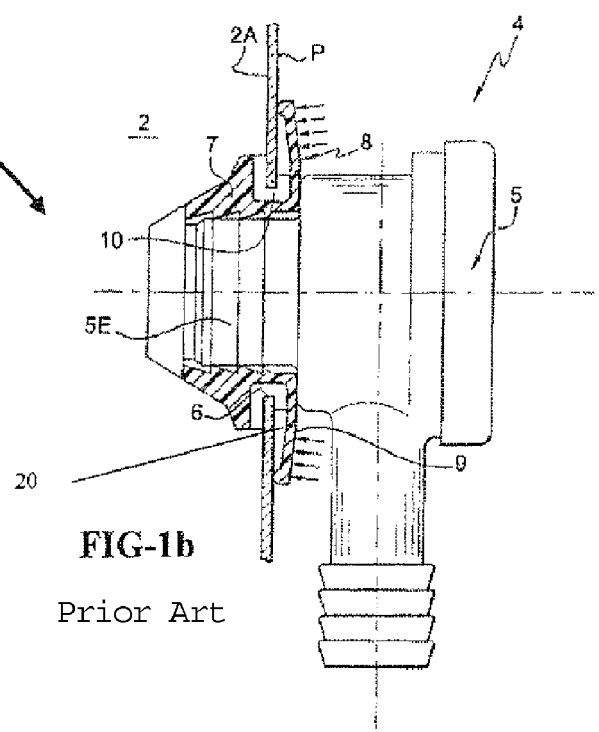
FIG. 1b is a view in longitudinal section of a detail of the view shown in FIG. 1a, representing shut-off means which connect the inside of a front chamber with the free air.
Figure 1C:
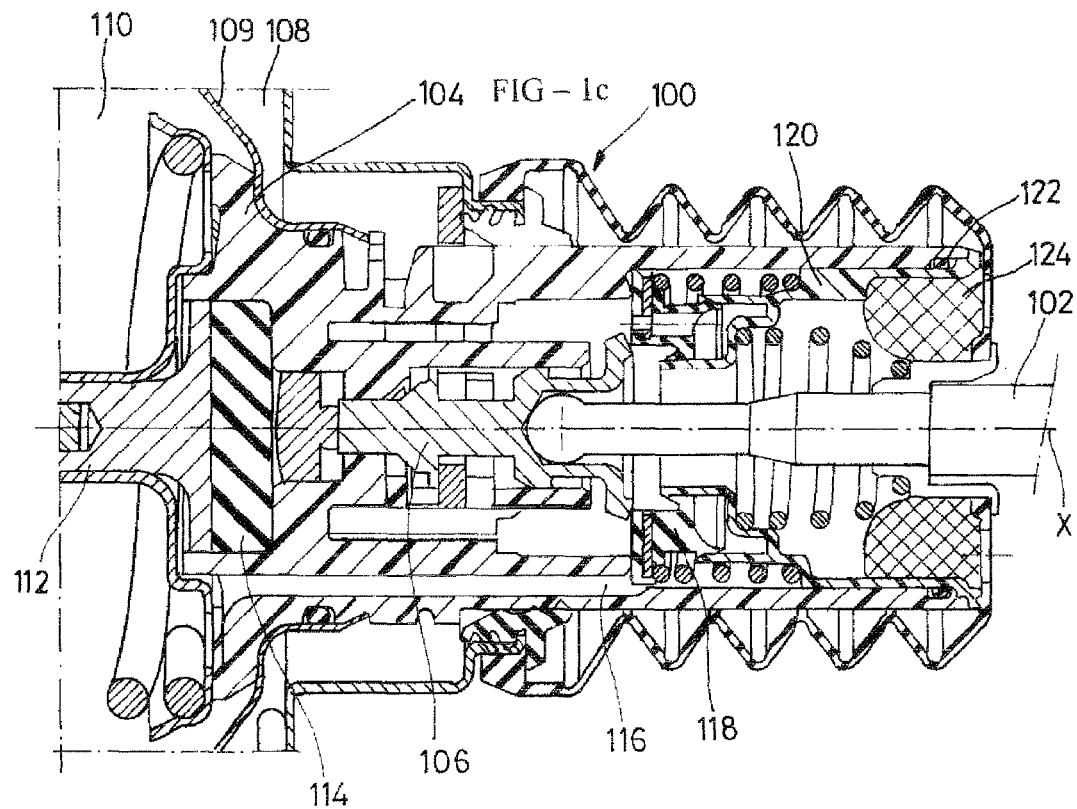
FIG. 1c is a view in axial section at 90° of part of a prior art booster, comprising in particular the piston of this booster.
Figure 2A:
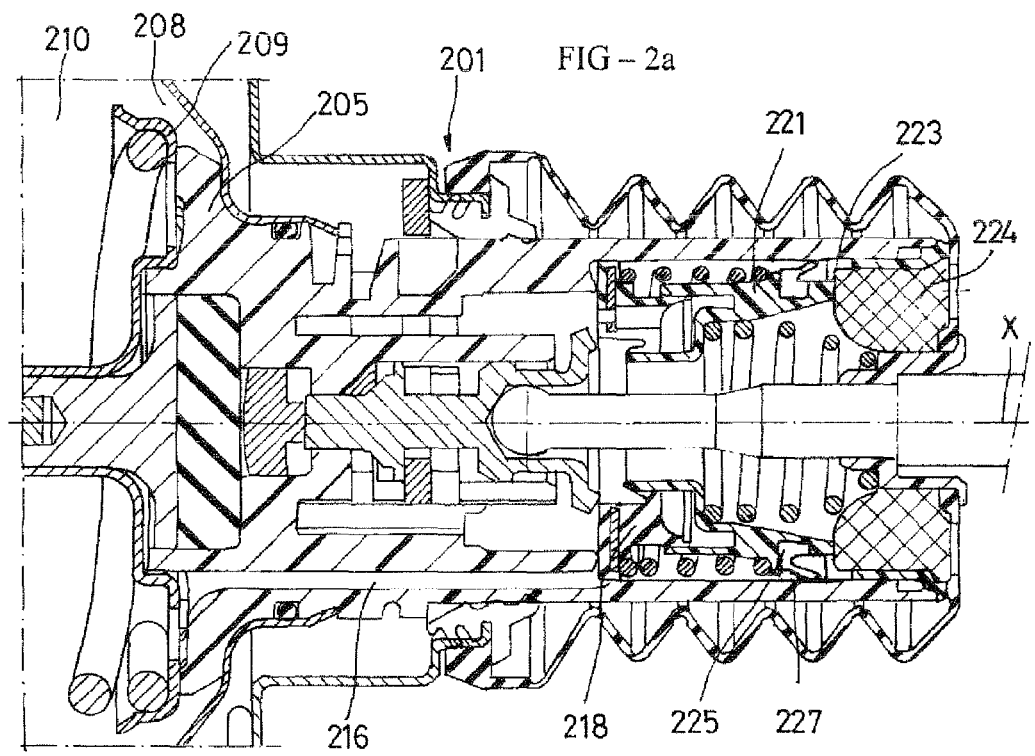
FIG. 2a is a view in axial section at 90° of part of a booster according to one embodiment of the invention, comprising in particular the piston of this booster, FIGS. 2b and 2c schematically represent two operating modes of one embodiment of the invention dependent on the pressure prevailing in the front chamber of a booster according to one embodiment of the invention.

FIG. 1c shows a schematic view in axial section at 90° of part of a prior art booster 100, in particular its piston 104, and FIG. 2a shows a schematic view in axial section at 90° of part of a booster 201 according to one embodiment of the invention, comprising in particular the piston 205 of this booster. Thus, it is easy to see the differences between the prior art and this embodiment of the invention.

The booster of FIG. 1c operates in a manner which is known to a person skilled in the art, so it will thus be described in brief: a driver, pressing on the brake pedal (not shown), moves forward a control rod 102, which in turn moves forward a distributor/plunger 106.

There is a three-way valve, which may be of the zero lost travel (ZLT) type, in the booster, this valve comprising a shutter which is able to cooperate with: a first equalizing valve seat borne by a rear longitudinal end of an extension of the piston 104, and a second intake valve seat borne by a frustoconical widening of the rear end of the distributor/plunger 106.

The shutter of the three-way valve is formed by an annular surface contained in the plane orthogonal to the axis X, this surface being borne by a front longitudinal end of a sleeve 118 made of flexible material and mounted immovably in the piston 104 by way of a cage 120 fitted, for example force-fitted, into the piston 104.

When the distributor/plunger 106 moves forward, the valve: comes into contact with the equalizing seat so as to interrupt communication between the front chamber 110 and the rear chamber 108, and moves away from the intake seat, thus allowing air at high pressure (generally atmospheric pressure) to enter the rear chamber 108.

A pressure differential is then established between the front chamber 110 and the rear chamber 108, this generating a power assistance force which is applied to the skirt 109.

The air enters the piston 104 through an annular filter 124 situated to the rear of this piston 104.

In the booster 100 of FIG. 1c, the piston 104 comprises an O-ring seal 122 which plays a part in isolating the valve assembly from the pressure prevailing outside the booster 100.

Part of a booster 201, comprising the piston 205 and in accordance with one embodiment of the invention, is represented in FIG. 2a.

In this embodiment, in order to position a nonreturn valve in the piston 205, a cup 225 according to one embodiment of the invention is arranged in an annular groove of a cage 221 according to one embodiment of the invention. This cage 221 bears a sleeve 218, as does the prior art cage 120.

This directional cup 225 comprises a lip 227 which extends radially toward the outside of the cup 225.

This cage 221 may be made of engineering plastic, for example. The cup may be made of rubber, for example.

The cage 221 in this embodiment comprises at least one aperture 223 which allows the outside air to pass through the cage 221, once filtered by a filter 224, so as to come into contact with the cup 225, and hence with its lip 227. One side of the lip 227 is hence permanently in contact with air which is at atmospheric pressure but filtered.

This air is hence much purer than that prevailing in the engine compartment since, firstly, the cup 225 is protected inside the piston 205 and, secondly, since the air passes through the filter 224.

FIGS. 2b and 2c show in detail the operation of the booster 201. These two figures represent a detail of that part in FIG. 2a which is below the axis X. FIG. 2b schematically represents the operation of this embodiment of the invention when there is a vacuum pressure in the front chamber 210. Thus, independently of the operation of the three-way valve, this vacuum pressure exists in the channel 216 connecting the front chamber 210 with the three-way valve assembly.

The vacuum pressure is communicated below the sleeve 218 so as to arrive, below the cage 221, at the front face of the lip 227. Since this lip 227 forms a barrier between two volumes having different pressures, it is subjected to a force 229, resulting from this differential pressure, which tends to press it or to squash it against the outer casing 232 of the piston 205. Owing to this differential pressure, the lip ensures that the channel 216 is leaktight with respect to that part of the piston which is at atmospheric pressure.

Although, subsequent to a braking operation, when the driver releases the brake pedal, air has to circulate in the channel 216 in order to empty the rear chamber 208, this circulation will take place from the three-way valve toward the front chamber in the direction of the arrow 231.

FIG. 2c schematically shows what happens in this embodiment of the invention in the event of failure of the vacuum pressure in the front chamber 210. In that case, because of this failure, the pressure in the front chamber 210 increases, but furthermore, when the brake pedal is actuated, the movement of the skirt 209 causes the pressure in the front chamber 210 to increase further still. This pressure opposes the movement of this skirt 209, and hence the actuation of the pedal. In that case: this overpressure in the front chamber 210 is transmitted by the channel 216 to the front edge of the lip 227, the air then circulating in the direction of the arrow 233, and the outer lip 227 of the cup 225 is subjected to a force 235 and deforms, the air then flowing in the direction of the arrows 237 through the filter 224 and out of the piston 201; in this way it is possible to prevent the pressure in the front chamber 210 from increasing and to achieve an optimum efficiency in the event of a power assistance fault.

It can be seen in this embodiment that the O-ring seal 122 used in the prior art booster 100 is, advantageously, no longer needed since its function is performed by the cup 225. This solution to improve the efficiency of the booster, particularly when there is a failure of the vacuum pressure in the front chamber, hence makes it possible to dispense with one element, and hence to reduce the extra cost of a booster according to this embodiment of the invention. This embodiment makes it possible to obtain a booster having an acceptable cost, without increasing its mass and while reducing its size (no projecting part on the shell covering the front chamber) in relation to the booster described in document FR 2 864 501, while at the same time solving the stated problem.

The operation of a booster according to this invention thus remains reliable, even, in particular, in the event of failure in the vacuum circuit. Furthermore, by virtue of this invention, given that the nonreturn valve is within the booster (like the cup in the above-described embodiment), said valve is protected from the dust prevailing in the engine compartment.

This invention can be subject to multiple variants. In particular, the fluid employed in the booster may be other than air and/or the high reference pressure may be a pressure other than atmospheric pressure (for example in the context of using compressed air).

The present invention applies primarily to the motor vehicle brake industry.

The invention claimed is:

1. Pneumatic brake booster (201) having an axis (X), comprising an enclosure divided into a front chamber (210) and a rear chamber (208) by a skirt (209) fastened to a piston (205) mounted so that it can slide in the axial direction (X), the booster comprising a nonreturn valve (225) to evacuate air from the front chamber when the pressure prevailing exceeds a certain reference value, characterized in that this nonreturn valve (225) is internal to the booster (201) and in that, with the rear chamber (208) being designed to be connected either to the front chamber (210) via a channel (216) passing through the piston (205) or to an internal part of the piston having the reference value as pressure, the nonreturn valve (225) is mounted in the piston (205) such that the moving part (227) of the nonreturn valve (225) is between air coming from this channel (216) and air coming from the internal part of the piston having the reference value as pressure.

2. Brake booster (201) according to claim 1, characterized in that the piston (205) comprises at least one filter (224) for filtering the air which enters the internal part of the piston (205) having the reference value as pressure.

3. Brake booster (201) according to claim 1, characterized in that the nonreturn valve comprises a directional cup (225) comprising a lip (227) which extends radially toward the outside of the cup, the lip (227) being designed to: block the passage of the air from the internal part of the piston having the reference value as pressure to the channel (216) connecting the rear chamber (208) and the front chamber (210), when the pressure in this channel (216) is below the reference value, allow the air from the channel (216) connecting the rear chamber (208) and the front chamber (210) to pass toward the internal part of the piston having the reference value as pressure, when the pressure in this channel (216) is above the reference value.

4. Brake booster (201) according to claim 3, characterized in that the cup (225) is mounted in a radial groove of a cage (221) bearing a three-way valve shutter which is able to open and to close the channel (216) connecting the rear chamber (208) and the front chamber (210) and to connect rear chamber (208) with a source of pressure at the reference value, this cage (221) being adapted by means of at least one aperture (223) to allow the air present in the internal part of the piston having the reference value as pressure to pass as far as the lip (227) of the cup (225).

5. Brake booster (201) according to claim 2, characterized in that the nonreturn valve comprises a directional cup (225) comprising a lip (227) which extends radially toward the outside of the cup, the lip (227) being designed to: block the passage of the air from the internal part of the piston having the reference value as pressure to the channel (216) connecting the rear chamber (208) and the front chamber (210), when the pressure in this channel (216) is below the reference value, allow the air from the channel (216) connecting the rear chamber (208) and the front chamber (210) to pass toward the internal part of the piston having the reference value as pressure, when the pressure in this channel (216) is above the reference value.

6. Brake booster (201) according to claim 5, characterized in that the cup (225) is mounted in a radial groove of a cage (221) bearing a three-way valve shutter which is able to open and to close the channel (216) connecting the rear chamber (208) and the front chamber (210) and to connect rear chamber (208) with a source of pressure at the reference value, this cage (221) being adapted by means of at least one aperture (223) to allow the air present in the internal part of the piston having the reference value as pressure to pass as far as the lip (227) of the cup (225).

* * * * *